(12) United States Patent
Brownstein et al.

(10) Patent No.: US 6,632,501 B2
(45) Date of Patent: Oct. 14, 2003

(54) LOOSE FIBER ADSORBENT

(76) Inventors: Jerry M. Brownstein, 70 E. Sunset Way #188, Issaquah, WA (US) 98027-3813; Kathy R. Brownstein, 70 E. Sunset Way #188, Issaquah, WA (US) 98027-3813; Brent A. Hepner, 16810 SE. 224th, Kent, WA (US) 98042

( * ) Notice: Subject to any disclaimer, the term of this patent is extended or adjusted under 35 U.S.C. 154(b) by 123 days.

(21) Appl. No.: 09/875,591

(22) Filed: Jun. 6, 2001

(65) Prior Publication Data

US 2002/0195393 A1 Dec. 26, 2002

(51) Int. Cl.[7] .................................................. D04H 5/00
(52) U.S. Cl. ........................... 428/74; 428/76; 428/212; 428/220; 442/327; 442/414
(58) Field of Search ................. 428/212, 220, 428/74, 76; 442/327, 414

(56) References Cited

U.S. PATENT DOCUMENTS

| | | | | |
|---|---|---|---|---|
| 4,045,833 A | * | 9/1977 | Mesek et al. .................. 5/484 |
| 4,070,287 A | | 1/1978 | Wiegand et al. .............. 210/40 |
| 4,184,953 A | | 1/1980 | Allinson et al. .............. 210/82 |
| 4,212,733 A | | 7/1980 | Goto et al. ................... 210/36 |
| 4,329,226 A | | 5/1982 | Thompson ................. 210/180 |
| 4,493,772 A | | 1/1985 | Tanaka ....................... 210/799 |
| 4,707,269 A | | 11/1987 | Ohue et al. ................ 210/651 |
| 4,780,211 A | | 10/1988 | Lien ........................... 210/644 |
| 4,859,348 A | | 8/1989 | Jusaitis et al. .............. 210/799 |
| 4,902,433 A | | 2/1990 | Graham et al. ............. 210/791 |
| 4,965,129 A | | 10/1990 | Bair et al. ................... 428/398 |
| 5,080,956 A | | 1/1992 | Smith ......................... 428/166 |
| 5,165,821 A | | 11/1992 | Fischer et al. ................ 405/63 |
| 5,304,311 A | | 4/1994 | Codiglia ..................... 210/693 |
| 5,407,575 A | | 4/1995 | Vinsonhaler ................ 210/484 |
| 5,571,604 A | | 11/1996 | Sprang et al. .............. 428/212 |
| 5,630,873 A | | 5/1997 | Weiser et al. ............... 106/417 |
| 5,672,306 A | | 9/1997 | Sprang et al. .............. 261/136 |
| 5,744,406 A | * | 4/1998 | Novak ......................... 442/121 |
| 5,779,392 A | * | 7/1998 | Mendes ........................ 405/63 |
| 5,855,784 A | | 1/1999 | Pike et al. ................... 210/505 |
| 5,993,675 A | | 11/1999 | Hagerthy .................... 210/799 |

FOREIGN PATENT DOCUMENTS

| | | | |
|---|---|---|---|
| JP | 02-160917 | * | 6/1990 |
| JP | 10-331063 | * | 12/1998 |

* cited by examiner

*Primary Examiner*—Elizabeth M. Cole
(74) *Attorney, Agent, or Firm*—Ronald M. Anderson

(57) ABSTRACT

A sorbent and filter media material produced from a mass of delustered hydrophobic and lipophilic fibers. In one embodiment the fibers are mixed together to form a cohesive wad of fibers. The wad has a substantial volume of internal interstices available to absorb a liquid hydrocarbon or an organic liquid, and the surfaces of the fibers also adsorb that liquid. The combination of adsorption and absorption enables the sorbent to sorb up to twenty times it own weight of hydrocarbon or organic liquid. Preferably a majority of the fibers are of a relatively shorter length, while a minority of the fibers are of a relatively longer length. The longer fibers help bind the wad together into a cohesive mass that has a substantial volume of internal interstices. After a short time during which the hydrocarbon is sorbed, the wadded mass can be collected, pressed to recover the hydrocarbon, and recycled.

22 Claims, 6 Drawing Sheets

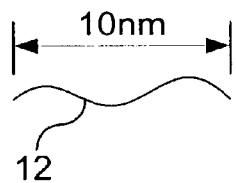
FIG. 1A
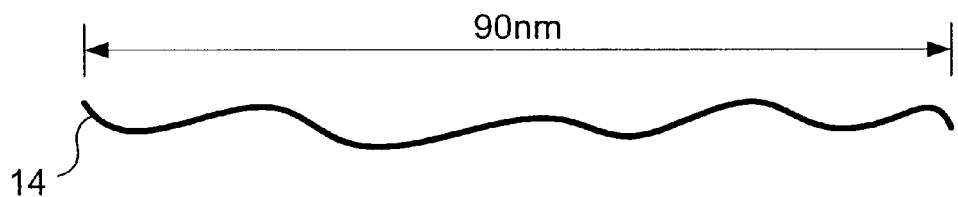
FIG. 1B
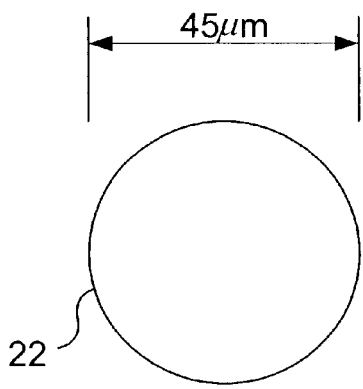
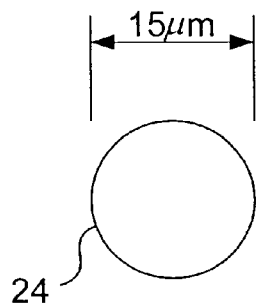
FIG. 2A        FIG. 2B

LOOSE FIBER ADSORBENT

FIELD OF THE INVENTION

The present invention is generally directed to a delustered fiber sorbent and a method of using the delustered fiber sorbent in the removal of hydrocarbon products from a contaminated material, and more specifically, to the removal of hydrocarbon products contaminating the surface of an aqueous medium, by employing a wadded mass of delustered hydrophobic and lipophilic fibers that are placed in contact with the contaminated surface so as to sorb the hydrocarbon products.

BACKGROUND OF THE INVENTION

The widespread use of petroleum products is accompanied by the almost statistical certainty that accidents involving the release of petroleum products into the environment will occur. In recognition of the deleterious effects such spills can have on the environment, many governmental agencies have drafted regulations mandating that spill response equipment, including sorbent material, be readily available to contain and collect the spilled material, to minimize the deleterious environmental effects of the petroleum products.

Due to increasing globalization, many nations are involved in transporting extremely large volumes of raw petroleum and petroleum products in tanker ships via waterways, such as lakes, rivers, and, oceans and in tanker vehicles or railcars that travel adjacent to waterways. Accidents involving large volumes of petroleum, such as the Exxon Valdez incident in Alaska, have generated tremendous concern among the public. In response to such incidents, various governmental agencies have adopted strict spill response regulations to prevent, or at least minimize, the damage from a future large scale spill on waterways. Such regulations often provide for the creation of spill response teams that are required to stockpile large quantities of sorbent material at locations that are associated with high traffic of large volumes of petroleum products. In recognition of the need for sufficient quantities of sorbent material to be readily available at many different locations, it would be desirable to provide an efficient, inexpensive, and lightweight sorbent product that can be used to remove petroleum and other hydrocarbon products from contaminated surfaces, including the surface of a body of water.

The prior art includes many different types of sorbent products. Sorbents work either by absorption, adsorption, or both. Absorption is a process in which a material is taken in through pores or interstices of another material, while adsorption is a process in which a material is accumulated on the surface of a solid or liquid. In general, sorbents that function via both absorption and adsorption tend to be more effective in enabling a petroleum or other hydrocarbon spilled on a surface to be collected and removed. It would therefore be desirable to provide a sorbent that is sufficiently economical and environmentally friendly to be used on the surface of a body of water, and which both adsorbs and absorbs petroleum and other hydrocarbon products.

The prior art recognizes that an effective sorbent material should have a high affinity for sorbing the target material to be collected and removed, and that the sorbent should preferably sorb a relatively large amount of the target material per unit weight of the sorbent. Effective sorbents tend to have a relatively great surface area, so as to encourage contact of the sorbent with the target material. With respect to sorbents employed to recover hydrocarbons from the surface of a body of water, a low specific gravity ensures that the sorbent will float on the water surface, both before and after hydrocarbons have been sorbed.

U.S. Pat. No. 5,304,311 discloses an elastomeric ethylene/ alpha-olefin copolymer, optionally copolymerized with a diene, that can be applied in a granular subdivided form. After absorbing the hydrocarbon product, the sorbent forms a jelly-like, homogeneous mass, which can then be removed by conventional mechanical means. The jelly-like mass is cohesive, and modest wave action will not disperse the sorbent beyond a desired area of treatment. While effective, such a material requires a finite contact period to transition from the granular state to the jelly-like mass. Sorbents such as that disclosed in the above-referenced patent are often referred to as solidifiers, as they change oil from a liquid to a solid. Unlike sorbents, solidifiers do not release solidified oils under pressure, ensuring that the "dripping-sponge" effect is eliminated, which in some situations may be desirable. However, there are many instances in which it may be desirable to recover and recycle any petroleum product that has been picked up by a sorbent. A French study of oil solidifying agents concluded that the following problems are associated with solidifiers: (1) the reaction of cross-linkers (in the solidifier) with portions of oil that are in direct contact results in non-uniform solidification; (2) the non-selective nature of cross-linkers that will solidify anything that contains hydrocarbons, including weeds and other organic matters; (3) mechanical difficulty in removing a solidified spill, since it cannot be pumped; and, (4) the large amount of solidifier that is required to cross-link and solidify an oil spill. Finally, due primarily to the cost of the ingredients, such as the cross-linkers required to facilitate the solidifying reaction, solidifiers such as that disclosed in the above-referenced patent tend to be somewhat expensive. It would be desirable to provide a more rapidly acting sorbent material, which is less costly to produce, requires a relatively small volume of sorbent to be employed, and which can be processed to recover sorbed hydrocarbons if desired.

In addition to granular solidifying sorbents, the prior art also discloses the use of polymeric fibers and expanded polymeric foams to sorb petroleum products. U.S. Pat. No. 5,407,575 describes a relatively small two-part sorbent pad having a flat, chemically treated polyethylene foam inner core completely surrounded by a flexible, durable, chemically treated polypropylene fabric cover. The sorbent pad is intended to float on top of petroleum covered water and to soak up the petroleum or oil and hold it within the inner core until it can be removed by squeezing the sorbent pad between rollers, thereby recovering the oil for storage in a container. The sorbent pad can then be returned to the water to pick up more petroleum. The sorbent pad is chemically treated to increase the pad's ability to attract and hold oil by both adsorption and absorption and to further increase the pad's ability to repel water. This treatment necessitates extra processing in the manufacture of the sorbent, thereby increasing its cost. While the sorbent pad is useful, it would be desirable to provide a lower cost sorbent that are not in a pad configuration and thus can be carried or stored in large quantities as needed, in order to be able to treat massive oil spills, such as those associated with an oil tanker running aground and breaking apart.

In addition to employing polymeric granules and foams, the prior art also discloses using polymeric fibers as a petroleum sorbent. Many patents disclose various filters for either cleaning oil, or removing oil from water, which include polymeric fibers. Fibers that have little cotton or cellulose content are hydrophobic, and have a high affinity for petroleum. Examples of patents that disclose the use of polymeric fibers in a filter include U.S. Pat. No. 4,329,226, which discloses a filter apparatus for reconditioning oil and uses cotton fibers, polyester fibers, and wood (specifically aspen) fibers to filter dirty oil. U.S. Pat. No. 4,707,269 describes a non-woven hydrophobic fabric used to separate oil and water mixtures, and U.S. Pat. No. 5,855,784 describes a sheet filter formed of thermally bonded polymer fibers. U.S. Pat. No. 5,993,675 describes a fuel filter that includes polymeric micro-fibers to remove water from a hydrocarbon fuel.

Regulatory and governmental agencies are increasingly focusing on the use of environmental friendly products. In addition, there is a general preference by many such agencies to purchase recycled products over new products, whenever possible. Thus, it would be desirable to provide a sorbent that can be produced from scrap or recycled materials, with minimal required processing.

In addition to using polymeric fibers for filters, such fibers have also been employed as sorbents. U.S. Pat. No. 5,080, 956 describes a laminate mat designed to be placed underneath machinery to catch oil drips machinery and comprising flow directing means, and an adsorbent layer made from a mat of OLEFIN™ fiber. Polymeric fibers have also been used as fillers for booms and pillows, most often in the form of a mass of spun fiber inserted into a boom or pillow. While these sorbent products are functional, they employ virgin fiber, and thus offer no advantage for those seeking to use a recycled product. It would therefore be desirable to provide a hydrophobic and lipophilic fiber-based sorbent product that can be produced more economically than currently available sorbents, and which can be made from recycled material. It should be noted that particularly in respect to recycled fibers, there is a perception that recycled fibers are generally poorer in quality than virgin fiber. It would therefore be desirable to provide a recycled fiber based sorbent that is as effective as, if not more effective than, virgin fiber-based sorbents.

SUMMARY OF THE INVENTION

The present invention preferably employs synthetic fiber waste that would otherwise be disposed of in a landfill or other waste facility. While virgin synthetic fiber could be employed in the present invention, additional processing steps would be required to achieve the greater sorption efficiency that are provided by waste fibers from the textile industry. Note that synthetic fibers are naturally hydrophobic and lipophilic (i.e., they exhibit a natural affinity to sorb hydrocarbons, while at the same time they do not sorb water, making them well suited for sorbing hydrocarbons from the surface of a body of water). Accordingly, synthetic fibers are well suited for use as sorbents. Via empirical testing and analysis, applicants have determined that enhanced sorption efficiency can be obtained relative to other virgin polymer-based sorbents by controlling the fiber lengths and by using specially treated fibers.

Traditional virgin synthetic fibers have good adsorption properties with respect to hydrocarbons. Depending on the physical state or configuration of the fibers, virgin synthetic fiber-based sorbents may also have good absorbent properties. Adsorption is based on the attraction of material to the surface of a sorbent. Because of the natural chemical affinity between petroleum products and synthetic fibers, generally most synthetic fibers are reasonably effective at adsorbing hydrocarbons. In contrast, absorption is more a function of the physical state or configuration of the sorbent, because absorption involves the uptake of a material into a plurality of interstitial spaces within a matrix formed by the sorbent. A single, generally elongate extending fiber has no interstitial spaces (unless that fiber has been specially treated to enable the interior of the fiber to be accessible to a material, such as a dye), and cannot provide absorption of a material. However, a mass of fibers form a plurality of interstitial spaces in which absorption occurs. Such a mass can be beneficially employed as a sorbent or filter media.

Applicants have discovered that a mass of hydrophobic and lipophilic fibers having a specific range of lengths, when mixed together to form a matrix, have a greatly enhanced absorbency and serve as a very efficient sorbent. This matrix of fiber having a preferred range of lengths are referred to herein and in the claims that follow, as a "wadded mass," or alternatively, as a "wad." A wad preferably includes a substantial majority of shorter fibers and a minority of longer fibers (i.e., relative to a mid-length within the specific range of lengths). The long fibers act as a natural binder to give the resulting wad cohesiveness. The cohesiveness is sufficient so that the wad does not need to be encapsulated in a boom when used in treating oil spills. In moderate marine conditions, even normal wave action will not unduly disperse the wadded mass of sorbent, which is in sharp contrast to granular sorbents and non-wadded fiber based sorbents that typically require the use of encapsulating booms so that the respective sorbents are not unduly dispersed.

Empirical testing has determined that fiber lengths ranging from about 5 mm to about 100 mm are most preferred. A substantial majority of the fibers preferably range from about 5 mm to about 55 mm in length, and most preferably, about 70% of the fibers fall into the aforementioned range of length. The length of a minority of the fibers is in the range of from about 60 mm to about 100 mm in length, and most preferably, less than about 30% of the fibers are in this range. Regardless of the specific range employed, a substantial majority of the fibers must be relatively short to provide the desired large surface area, and the desired plurality of interstitial volumes. Also, regardless of the specific range of lengths of the fibers, sufficient relatively long fibers are required to enable the wadded mass to achieve a cohesiveness that resists dispersing the fibers when the wadded mass is exposed to a moderate wave action. Such dispersion is not desired, as widely dispersed sorbents are much more difficult to recover.

The ratio of short fibers to long fibers in the wadded mass is important in providing a high efficiency sorbent and filter media. A majority of short fibers increase sorbency by increasing the total surface area of the sorbent and by ensuring that the wadded mass includes a larger volume of interstitial spaces for absorption of a material. However, if only short fiber lengths are employed, the resulting mass of short fibers will be too easily dispersed by wind or wave action, and very little interstitial spaces will be available for absorption of hydrocarbons. Thus, a mass of only the short fibers would be difficult to recover and would be a less efficient sorbent, as very little absorption would take place. The only mechanism available for removing hydrocarbons in such a dispersed mass of only short fibers would be adsorption. Sufficient long fibers must be included to enable the wadded mass to be achieved, in accord with the present invention.

It has also been empirically determined that delustered synthetic fibers are more efficient sorbents than synthetic fibers that have not been delustered. Normally, virgin synthetic fibers are delustered when the fibers are to be used in fabrics. The delustering removes the inherent shininess of a synthetic fiber. Sometimes, a high luster in textiles is considered by consumers to look "cheap," so a low-luster finish will enhance the richness of a particular fabric or carpeting. Because this is an aesthetic concern, as opposed to a functional concern, virgin synthetic fibers employed for sorbents are not delustered. Empirical results indicate that sorption by the delustered synthetic fibers of the present invention occurs extremely rapidly. As will be discussed in detail in the examples provided below, under controlled conditions, delustered synthetic fibers sorbed 9.5 times their own weight of oil in only about 10 seconds.

The delustering process appears to enhance the sorbent effectiveness of a fiber in several ways. First, the delustering process works by "scuffing" the surface of individual fibers, to reduce their sheen. This scuffing step results in rough fiber surfaces, and an individual fiber with a rough surface will have significantly more surface area than a fiber of the same size that has a smooth (or lustrous) surface. The increased surface area not only increases adsorption per fiber, but the rough surface of the fibers also increases the amount of interstitial volume available for absorption. The rough surface provides fiber-to-fiber traction, which further enhances the ability of a plurality of fibers to cohesively join together in the wadded mass described above. As indicated above, the wadded mass configuration provides significant interstitial volume that enhances absorption. The delustering process substantially enhances the sorbency of synthetic fibers, and it is preferable to employ a wadded mass of delustered hydrophobic and lipophilic fibers for the present invention. A common method of delustering fibers is to treat synthetic fibers with titanium dioxide.

Yet another aspect of the present invention is directed to a method of recycling waste fiber scrap into a sorbent product. Whole cloth is often recycled into other cloth applications. A large percentage of the used clothing that is recycled is reused as clothing and is often shipped overseas for use in third-world countries. A surprisingly efficient collection and distribution system enables a used, but still serviceable pair of pants from the United States to be shipped to a third-world country and sold at a cost significantly lower than a locally produced garment. Cloth is also recycled into wiping rags for industry and engineering applications. Almost 50% of recycled textiles are recycled back into clothing. About 20% become wiping and polishing cloths, and another 25% are regenerated—converted back into fiber. Little of this fiber (referred to as "shoddy") is currently being re-spun into new textiles, because such regenerated fibers are weaker than virgin fibers, resulting in a lower quality fabric. Instead, shoddy is often used in lower value applications such as for furniture stuffing or insulation in vehicles. However, the demand for shoddy, particularly shoddy that is primarily synthetic fiber (known as "poly shoddy"), is generally significantly less than the available supply. In many areas of the country, rag mills are forced to dispose of poly shoddy in municipal landfills, at costs of up to five cents a pound.

In most of the conventional uses of shoddy, fiber length and its affect on the resulting matrix of the shredded fabric is not critical. Indeed, most shoddy is pressed into felt or other non-woven fabric, often after being impregnated with binders and adhesives. Generally, the fabric is processed to remove buttons and zippers, and the fabric is then shredded to a more or less fibrous state. In one aspect of the present invention, this traditionally processed poly shoddy can be used in encapsulating booms and pillows as a sorbent material. The fibers in the poly shoddy will already be substantially delustered, as most fabrics are made from delustered fiber. However, it is anticipated, and empirical testing has verified this to be true, that the sorbent efficiency of poly shoddy can be improved by applying more stringent processing steps than are normally required for generating shoddy.

One aspect of the present invention calls for manipulating the shredding process to control the fiber lengths achieved. As noted above, the majority of the fibers are preferably relatively short, from about 5 mm to about 50 mm in length. Preferably, more than about 70% of the fibers are within this range. A minority of the fibers must be relatively long, to enable the wadded mass described above to be achieved. The wadded mass configuration includes so much interstitial space that fibers in the wadded mass configuration are significantly more sorbent than the same fibers in a more planar configuration, such as a mat, due to the absorption occurring in the interstitial spaces. Preferably the relatively long fibers are from about 60 mm to about 100 mm in length, and comprise less than about 30% of the fibers.

The exact method used for controlling fiber length is a function of the equipment employed to process the synthetic fabric. In general, additional processing time will be required to achieve the desired dimensions. Note that for traditional uses of shoddy, it is preferable to minimize processing time, even if not all the fabric is completely reduced to fiber. In the present invention, the more complete the transformation from fabric to fiber, the more efficient the sorbent will be. It should also be noted that up to approximately ten percent by weight of the wadded mass can comprise non-synthetic fiber, such as cotton and cellulose fibers, without reducing the sorbent power of a wadded mass. Indeed, empirical testing has determined that the presence of small amounts of hydrophilic fibers is actually beneficial. Thus, an additional requirement with respect to the conventional poly shoddy manufacturing process is to presort the material being processed, to ensure that the desired blend or ratio of synthetic to non-synthetic fiber is achieved. It has been determined that up to 10% non-synthetic fiber is desirable. The presorting will be accomplished by hand, by technicians who can generally determine whether a textile is synthetic or non-synthetic by touch. Preferably the presorting will also be employed to remove undesirable non-synthetic textiles, such as vinyl textiles, or bulky textiles, such as sleeping bags, from the textiles that will be shredded.

One characteristic of conventionally processed poly shoddy is the presence of "flags" or "bits" in the final product. These flags and bits, generally quadrilateral in shape, represent portions of a textile item that have been reduced in size, but not to the fiber level. Such flags or bits can range in size from relatively small (fractions of an inch in dimension) to relatively large (over a foot in dimension), and their presence generally does not interfere with conventional uses of shoddy (for example, a furniture stuffing or to produce carpet pads). However, in the present invention, the presence of such flags reduces the amount of fiber present in a wadded mass, thereby reducing the sorbency of the product. Accordingly, it is desirable for the conventional poly shoddy producing process to be controlled to reduce the amount of flags or bits present in the final product.

A final aspect of the present invention is directed toward the use of a mass of delustered hydrophobic and lipophilic fibers as a filter media. In one embodiment, the mass of delustered hydrophobic and lipophilic fibers are processed into the previously described wadded mass by controlling the relative length of individual fibers. In another embodiment, the mass of delustered hydrophobic and lipophilic fibers is configured into a non-woven pad that is used as a filter. While such a non-woven pad lacks the extensive interstitial volume present in a wadded mass, the delustered fibers still provide an excellent filter media. When the delustered hydrophobic and lipophilic fibers are produced from textile waste, such pads can be produced at a low cost and can be employed as filter media or sorbents. Small pads can be fabricated for use with small spills, or large pads, referred to as blankets, can also be produced for use in cleaning up larger spills of petroleum products.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1A is a schematic view of a relatively short hydrophobic and lipophilic fiber that comprises the majority of a sorbent wad of fibers in accord with the present invention;

FIG. 1B is a schematic view of a relatively long hydrophobic and lipophilic fiber that comprises the minority of a sorbent wad of fibers in accord with the present invention;

FIG. 2A is a schematic view of a relatively wide hydrophobic and lipophilic fiber that comprises the majority of a sorbent wad of fibers in accord with the present invention;

FIG. 2A is a schematic view of a relatively thin hydrophobic and lipophilic fiber that comprises the minority of a sorbent wad of fibers in accord with the present invention;

DESCRIPTION OF THE PREFERRED EMBODIMENT

Figure 3:
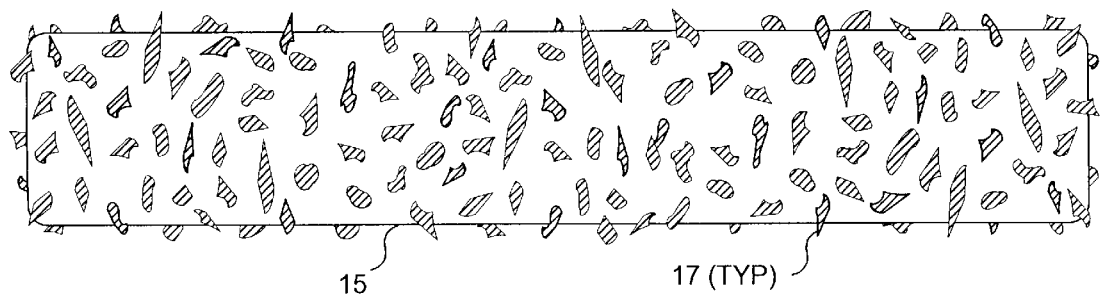
FIG. 3 is a schematic view of a fiber that has been delustered with titanium dioxide.

FIGS. 1A and 1B illustrate schematic representations of a relatively short fiber 12 and a relatively long fiber 14, pluralities of each of which are required in the sorbent wad of the present invention. The exact proportions of the individual fibers are not critical, though a majority of the fibers need to be relatively short, while only a minority of the fibers should be relatively long. The relatively short fibers provide a great deal of surface area, while the relatively long fibers help bind the relatively short fibers and relatively long fibers together into a wadded mass. In one preferred embodiment, the relatively short fibers are on the order of from about 5 mm to about 15 mm in length, while the relatively long fibers are on the order of from about 85 mm to about 100 mm in length. Such an embodiment also includes a plurality a fibers of intermediate length, ranging from about 15 mm to about 85 mm in length. Detailed examples of the fiber lengths of this preferred embodiment are discussed below.

A mixture of different fiber types is acceptable. The majority of the fibers must be hydrophobic and lipophilic (i.e., capable of adsorbing hydrocarbon products). Synthetic fibers such as polyester, nylon, acrylic, and triacetate can be beneficially employed as the majority of fibers. In a preferred embodiment, approximately 70% of the fibers are polyester, approximately 20% of the fibers are nylon, less than about 2% of the fibers are acrylic, and less than about 1% of the fibers are triacetate. It is anticipated that these relative percentages can vary considerably and still provide a useful sorbent, as each of the fibers individually meet the criteria of being hydrophobic and lipophilic (capable of sorbing a hydrocarbon).

FIGS. 2A and 2B illustrate schematic representations of a relatively thick fiber 22 and a relatively thin fiber 24. In a preferred embodiment of the present invention, a majority of the fibers are relatively thick, while a minority of the fibers are relatively thin. Again, the exact proportions of the individual fibers are not critical. In the preferred embodiment of the invention noted above, a majority of the fibers are relatively thick, while a minority of the fibers are relatively thin. The relatively thick fibers are on the order of about 45 $\mu$m in diameter, while the relatively thin fibers are on the order of about 15 $\mu$m in diameter. With respect to the length of fibers, the present invention requires that a substantial majority of the fibers be relatively short, while only a minority of fibers are relatively long. In this embodiment and all others, the terms "long" and "short" generally relate to a midpoint in the specific range of lengths of the fibers that are used. Such a mixture of fiber lengths enhances the sorbency of the resulting wad of fiber. With respect to the relative diameters of the individual fibers, it is anticipated that the diameters of the individual fibers require significantly less control, and do not significantly affect the sorbency of the wad. A mixture of different fiber diameters is expected to somewhat enhance the cohesiveness of a wad of fibers having a plurality of lengths, but to a lesser degree than the mixture of different fiber lengths. It should also be noted that fiber length is a function of processing, in that fibers can be processed to achieve a specific desired range of lengths. With respect to diameters, the diameter of a particular fiber is essentially a function of the specific material comprising the fiber. For example, the polyester fibers obtained from processing fabric waste into fibers, in accord with a preferred method of producing the sorbent of the present invention (discussed in detail below), are generally about 45 $\mu$m in diameter, while nylon fibers from the same source generally about 15 $\mu$m in diameter. Thus, relative diameters within the wadded mass can be varied by varying the mixtures of fibers employed.

It has been determined that delustering enhances the sorbency of synthetic fibers, which inherently have a sheen due to their smooth outer surface. The delustering effect has been empirically determined, and it is believed that at least two mechanisms are responsible for the increase in sorbency for delustered fibers. First, delustering significantly roughens the surface of individual fibers, significantly increasing the surface area of each individual fiber, and thus enabling a greater amount of adsorption per fiber. Secondly, it should be noted that rough surfaces of the individual fibers, in combination with the mix of short and long fiber lengths, enable a surprisingly cohesive wad of fiber sorbent to be achieved. The rough surfaces provide fiber-to-fiber traction, enabling adjacent fibers to better adhere to one another. The mix of a minor portion of relatively long fibers to a majority of relatively short fibers ensures that sufficient relatively long fibers are present to help bind the wadded mass together without the need for binding agents normally employed to bind amorphous masses of fiber together. This wadded mass configuration ensures that a significant amount of interstitial volume is available for absorption. Thus delustering is believed to enhance sorption by providing more sites for both adsorption and absorption to occur. While the wadded mass of the present invention, with its majority of relatively short fibers providing significant surface area, begins to sorb hydrocarbon products immediately upon contact, it is anticipated that it will be preferred to leave the wadded mass in contact with the hydrocarbon product to be sorbed for a reasonable length of time (for example, 10 minutes or more). While the process of adsorbing hydrocarbon products onto surfaces of the relatively short fibers, and the surfaces of relatively long fibers occurs rapidly, the process of absorption is expected to require more time. Absorption will occur in interstitial regions within the wadded mass. Delustering using titanium dioxide is a preferred technique, since it adds a significant amount of surface area to each individual fiber surface, as well as helping the fibers maintain a wadded mass configuration in which a plurality of interstitial volumes are available for absorption. It is anticipated that leaving the sorbent wadded mass of the present invention in contact with hydrocarbon products to be sorbed for additional time will enable hydrocarbon products to be more fully absorbed into these interstitial volumes within the wadded mass of delustered fibers.

Figure 4:
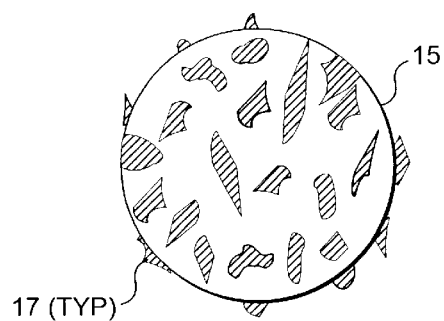
FIG. 4 is a schematic cross-sectional view of a fiber that has been delustered with titanium dioxide, clearly showing that the titanium dioxide particles are incorporated into the fiber matrix, rather than merely being dispersed on the surfaces of the fiber.

It should be noted that several different types of delustering processes are known in the art. One popular technique for reducing the luster of synthetic fibers that are obtained by melt-spinning is to introduce an inorganic substance such as silica or titanium oxide in the starting material (the base synthetic resin) before that material is subjected to melt-spinning. The inorganic substance becomes substantially uniformly distributed throughout the resulting fiber, appearing on both the exterior surface and interior of the fiber. FIGS. 3 and 4 show a fiber 15 that incorporates titanium dioxide particles 17 in its structure. Note that titanium dioxide particles 17 are not merely coated onto the surface of fiber 15, but are actually dispersed throughout the interior of fiber 15 as well. It should be noted that titanium dioxide is inert and non toxic, and thus, its presence in a sorbent product does not pose any environmental or health risks.

Delustering with titanium dioxide appears to offer several advantages. Titanium dioxide is a hydrophobic material, and its incorporation into a synthetic fiber is consistent with the desired goal of providing hydrophobic fibers. Furthermore, the incorporation of micro-crystalline titanium dioxide into a synthetic fiber substantially increases the surface area of each fiber, thereby substantially increasing the adsorbency of each fiber. Also, the relatively rough surface produces significant friction. Note that synthetic fibers that are not delustered are "slippery," and that in a mass of such fibers, cohesiveness is likely to be poor as individual fibers are prone to slip past each other. The titanium dioxide provides friction, so that individual fibers are much less likely to slip past one another, enabling the wadded mass of the present invention to be achieved.

Other delustering methods involve covering the surface of the fibers with a resin having a low refractive index, or developing uneven patterns in the surface of the fibers. For example, Japanese Patent Publication No. Sho 43-22349 discloses a method of subjecting a polyamide fiber to an inorganic acid to erode or etch the surface of the fiber. It is anticipated that these other methods of delustering fibers are less preferred for producing a sorbent fiber than the technique of delustering using a mineral such as titanium dioxide. Coating a fiber with a polymer that has a low refractive index will not produce an increased surface area on the fiber, or enhance fiber-to-fiber traction. Etching the surface of a fiber will produce an increased surface area on the fiber, but is not likely to enhance fiber-to-fiber traction. Therefore, delustering with an inorganic chemical such as titanium dioxide is preferred, particularly because the titanium dioxide particles significantly increase fiber-to-fiber traction, and significantly increase overall fiber surface area.

Figure 5:
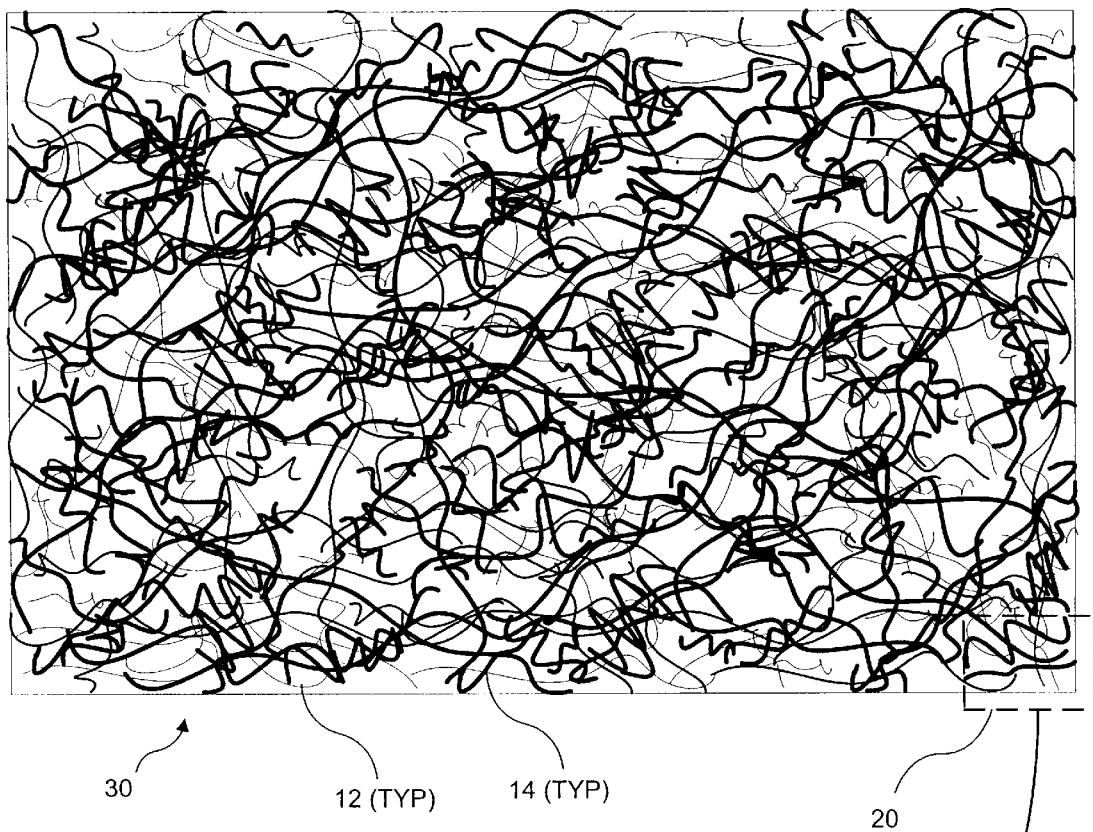
FIG. 5 is a schematic view of a plurality of relatively long hydrophobic and lipophilic fibers intermingled with a plurality of relatively short hydrophobic and lipophilic fibers to form a sorbent wadded mass in accord with the present invention.

If virgin fibers are to be used to produce a sorbent in accord with the present invention, then preferably an inorganic chemical such as titanium dioxide will be added to the resin before melt-spinning the fiber. If recycled synthetic textile products are shredded to generate a fiber sorbent in accord with the present invention, further treatment with titanium dioxide is not likely to be required, because the majority of delustered fibers used in the textile industry are produced using titanium dioxide (or similar inorganic materials). The reason for the widespread use of the titanium dioxide based delustering process is that it does not require an additional processing step to be performed after the production of the fiber (as is required if the fiber is coated with a different polymer, or etched with a chemical). The elimination of an additional processing step increases the efficiency of the production process, thereby lowering the overall cost of the product. While it is anticipated that the titanium dioxide delustering process will be the preferred method of delustering, due to its current widespread use and relatively low cost, other delustering processes that similarly increase fiber-to-fiber traction and significantly increase overall fiber surface area can also be beneficially employed. A wadded mass 30 in accord with the present invention is schematically illustrated in FIG. 5. A plurality of relatively short fibers 12 are intermingled with a plurality of relatively long fibers 14. As noted above, a minority of relatively long fibers 14 bind the mass of interleaved fibers (both long and short) together into the desired cohesive wadded mass. Without a sufficient amount of relatively long fibers, the relatively short fibers, even with the fiber to fiber traction enabled by the delustered fiber surfaces described above, would tend to disperse due to wind, wave action, or other forces. Such dispersion might enable the fibers to be blown away from contact with a spill and will make retrieving the sorbent difficult. However, using only relatively long fibers would considerably reduce the surface area associated with the wadded mass. Empirical testing has confirmed that a high surface area is key to a sorbent that begins sorbing material very rapidly, as well as being an important factor in achieving a sorbent that has a high capacity to absorb hydrocarbons. The examples provided below provide details on the relative percentages and ranges of different fibers and fiber lengths associated with a preferred sorbent wadded mass in accord with the present invention.

Figure 6:
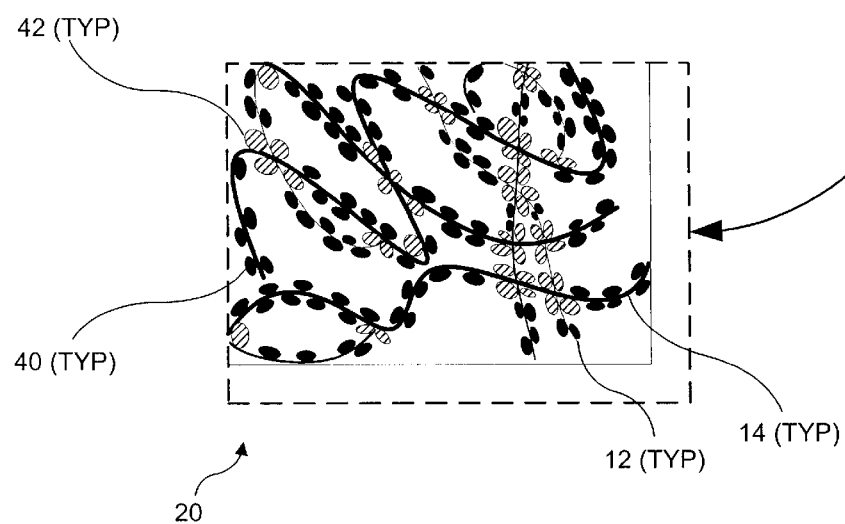
FIG. 6 is an enlarged view of a portion of the schematic view of FIG. 3, illustrating adsorption on the delustered surfaces of both the plurality of relatively long hydrophobic and lipophilic fibers and the plurality of relatively short hydrophobic and lipophilic fibers, as well as absorption at a plurality of interstitial spaces within the wad of sorbent.

FIG. 6 illustrates how wadded mass 30 provides a sorbent that exhibits both adsorbent capabilities, as well as absorbent capabilities. Hydrocarbon products 40 are adsorbed on individual surfaces of both relatively short fibers 12 and relatively long fibers 14. Hydrocarbon products 42 are absorbed into interstitial spaces within wadded mass 30, proximate to locations where relatively short fibers 12 and relatively long fibers 14 cross each other.

Figure 7:
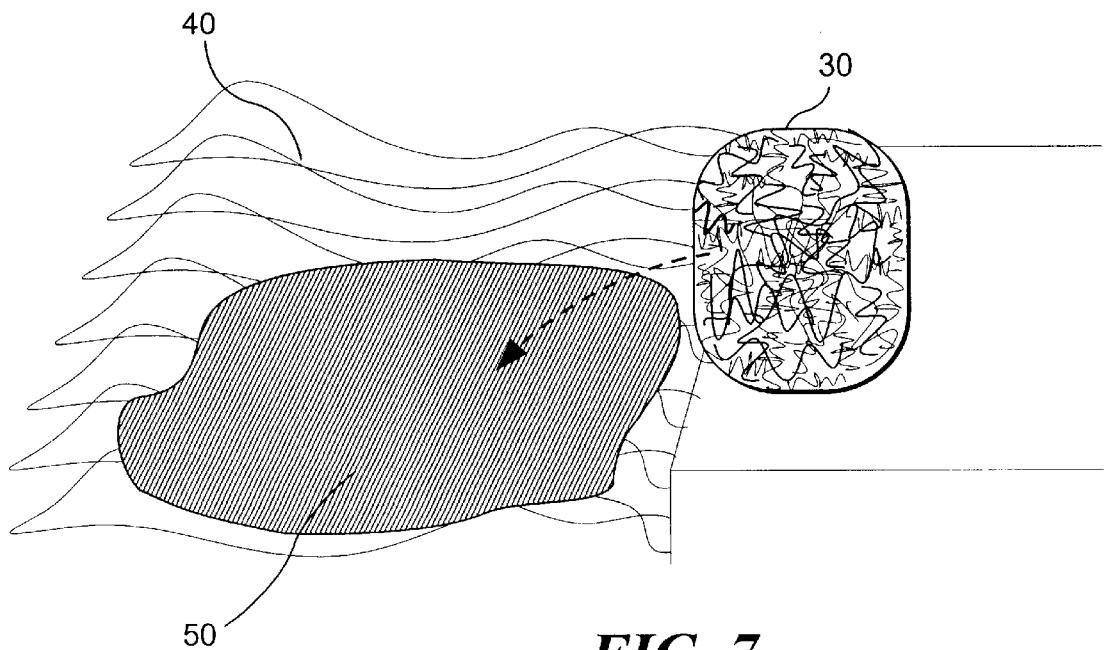
FIG. 7 is a schematic view of a bale of the wadded sorbent of FIG. 3 being pushed into a body of water proximate to an oil spill.

FIG. 7 shows a bale of wadded mass 30 being applied to a body of water 40 contaminated with an oil spill 50. Optionally, the wadded mass can be compressed before shipment to a site where it is used and then decompressed prior to spreading the wadded mass on the surface of the water. The wadded mass can be manually distributed over the water for a small spill, or can be "blown" on to the contaminated water surface using an appropriate blower (not shown) such as the type of blowers used to blow insulation into an attic. Once the wadded mass has been in contact with the oil slick for a brief period of time, wadded mass 30 can be mechanically retrieved. It should be noted that some currently available sorbent products, particularly solidification agents, require significantly longer time to reach their full sorbent capacity (up to 24 hours). The present invention requires only minimal contact time (merely seconds) to achieve a significant percentage of its total sorbent capacity. The sorbent product of the present invention will begin to sorb hydrocarbon products immediately upon contact. As the test data provided below show, a wadded mass of delustered synthetic fibers sorbed over 9.5 times its own weight of motor oil in only about 10 seconds. Peak sorbency occurred in about 60 seconds, with a sorption efficiency of over 98.5%. Additional contact time does not appear to lead to greater sorption. It is anticipated that when used in bulk, the sorbent of the present invention can be removed just minutes after its application, having sorbed a substantial mass of petroleum product (and being fully saturated).

While not shown, the sorbent of the present invention can be mechanically removed from the surface it was dispersed onto. It is anticipated that rakes or vacuum type removal equipment can be employed for this purpose. While very vigorous raking or suction will overcome the natural cohesiveness of the wadded mass, the wadded mass will merely fraction into small, still cohesive masses. Separating a wadded mass into smaller fragments will not destroy the cohesiveness of the smaller fragments. It is anticipated that wadded masses can be provided in bulk containers, such as bins, and that the contents of one or more bins can be applied with a blower unit, as noted above, to quickly apply the sorbent wadding to a relatively large area, which will be a distinct advantage in responding to large-scale spills. It should be noted that federal regulations pertaining to sorbents used in U.S waters prohibit sorbent products from being employed without an encapsulating envelope. While the present invention is physically capable of being utilized as an non encapsulated sorbent that is spread on the surface of a body of water, when used for cleaning petroleum product spills from water surfaces in the U.S., the present invention will likely be encased in an encapsulating envelope, such as a boom, sock or pillow. Such a restriction only applies to use of the material on bodies of water within the U.S.; and non encapsulated sorbent in accord with the present invention could readily be used on bodies of water elsewhere in the world, or on other types of surfaces, such as roadways or floors.

Once recovered from a surface previously contaminated with a hydrocarbon spill, the sorbent wadded mass can be pressed to recover the sorbed hydrocarbons. In an empirical study, over 87% of motor oil sorbed by a wadded mass in accord with the present invention was recovered by mechanically pressing the wadded mass. The wadded mass can then be reused, or disposed of as a waste product, for example, by incineration. The synthetic fibers (and trace natural fibers, if present) used to produce the sorbent wadded mass of the present invention are non toxic materials and are regularly disposed of in sanitary landfills. Of course, the ultimate disposal requirements of a wadded mass that has been used to sorb a hydrocarbon product is a function of the hydrocarbon product itself, as is true for all sorbent materials. However, the wadded mass of the present invention can be pressed to reduce the amount of sorbed material within the spent wadded mass, enabling the sorbed hydrocarbon product to be recovered and potentially reducing the disposal cost of the used sorbent.

The hydrophobic and lipophilic fibers used in the present invention may vary somewhat in composition. A preferred mixture of fiber types is provided in the examples below. In general, synthetic fibers that can be beneficially employed in the present invention include polyester, nylon, and acrylic. These fibers share the common characteristic of being light weight, inert and non toxic. Tests of a preferred fiber mixture disclosed in the examples below indicate that when incinerated, the residual ash was less than 1% (~0.6%). The U.S. Environmental Protection Agency has established guidelines for preferred residual ash percentages for sorbent materials, and those guidelines indicate that up to 2% ash is acceptable. From a disposal standpoint, the less ash generated by burning a sorbent material, the better, as the resulting ash must be hauled to a landfill. Without any hydrocarbon having been sorbed, the mixture disclosed below has a thermal energy rating of about 7,600 British Thermal Units (BTU) per pound. In general, the higher the BTU value of a material, the more likely that material is usable for energy production. The BTU value of coal varies substantially, and ranges from 10,000–15,000 BTU/pound. When the sorbent of the present invention is saturated, or partially saturated with a hydrocarbon product, the energy value of the sorbent significantly increases (note the sorbent sorbs up to 20 times its own weight in oil, and oil has a BTU value of ~19,000 BTU/pound). Thus, there is potential for disposing of the used sorbent by incineration that enables energy recovery. U.S. cement kilns in particular are noted for their use of high BTU value waste materials as supplementary fuels (the production of cement is a very energy intensive process).

Figure 8:
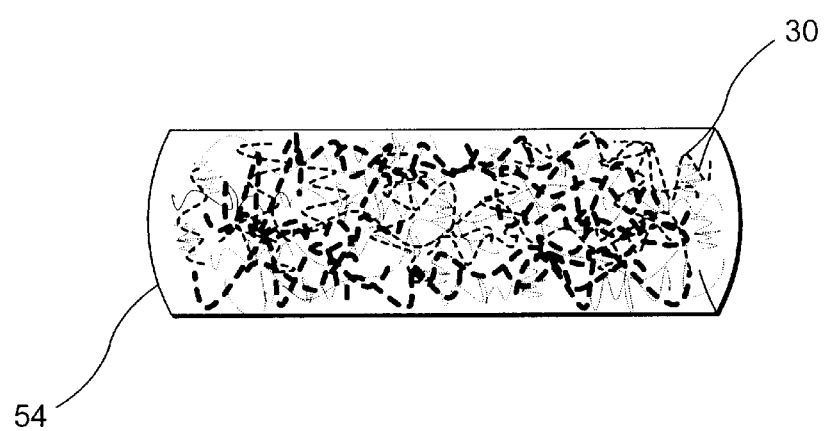
FIG. 8 is a schematic the wadded sorbent of FIG. 3 being used to fill an encapsulating boom.

It should further be noted that the hydrophobic and lipophilic fibers used in the present invention are light weight, and that they sorb up to 20 times their own weight. The mass of sorbent required to sorb a given volume of hydrocarbon is significantly less than the mass of some other types of sorbents, which reduces the final mass and volume of the used sorbent that must be disposed of, making the disposal cost of the sorbent of the present invention more economical. FIG. 8 shows the sorbent wadding of the present invention used as filling in an encapsulating boom 54 of a porous conventional type. While wadded mass 30 can be used without encapsulating boom 54, it is anticipated that the wadded mass filling in a boom will provide a popular alternative to virgin fiber or virgin granular polymer sorbents, especially for use in U.S. waters. The delustered fibers of the present invention offer improved sorption over the non-delustered fibers of conventional sorbents. Furthermore, the delustered fibers of the present invention can be produced from scrap fabric, providing a recycled sorbent product that environmentally conscious consumers are expected to prefer over sorbent products made from virgin material. Finally, a sorbent in accord with the present invention that is made from recovered fibers can be produced at a lower cost, compared to sorbent products made from virgin materials, as the raw material comprising the recycled fibers is often considered a waste product that would otherwise be disposed of in a landfill.

When distributed for use in treating spills, it is contemplated that the wadded mass in accord with the present invention can be included in a spill treatment kit that also provides instructions for its use. The instructions will indicate that the wadded mass is to be spread over a surface that is contaminated with a hydrocarbon product, allowed to sorb the hydrocarbon product, and then mechanically collected and removed from the surface. Such kits will likely be useful at marinas, where spills from boats refueling with gasoline or diesel fuel are fairly common and there is a need for a rapidly deployable sorbent material to cleanup the spilled fuel.

It has been noted above that a preferred source of the fibers for the sorbent wadded mass of the present invention is textile scrap. It should be noted that virgin material can be alternatively be employed; however, it is anticipated that textile and fabric scrap will be a preferred source, both because textile and fabric scrap have already been delustered, and because textile and fabric scrap is a lower cost raw material.

Virgin synthetic fiber can also be delustered and processed into the relatively short and relatively long fibers of the specific desired range of lengths required to achieve the sorbent wadded mass of the present invention. If virgin fibers are employed, it is preferred that a plurality of different fiber lengths be provided, rather that providing only shorter fibers of approximately 10 mm, and longer fibers of approximately 90 mm in length. It is believed that a mixture of somewhat random lengths, the majority of which are relatively short, and a minority of which are relatively long, help achieve a more cohesive wadded mass. Once the virgin delustered fibers are cut to the desired length, they must be thoroughly blended to achieve the spatial distribution needed to form a wadded mass. Casually mixing may not achieve the desired wadded mass having a plethora of interstitial spaces needed for efficient absorption to occur. A preferred mixing method is to vigorously blend the various fiber lengths mechanically, followed by introducing the blended mixture into a fast moving stream of air. The air streams adds loft and volume to the mixture, ensuring that the desired interstitial voids are present.

When scrap fabric is used as a raw material, the delustering step is not required. When rag mills process scrap fabric into recycled fiber, the fabric is first passed though a series of heavy crushing rollers that break and crush all zippers and buttons. Next the fabric engages large rotating drums equipped with hundreds of cutting blades that cut, rend and tear the fabric. Depending on the type of equipment employed by the rag mill, a second type of drum equipped with a plurality of pins extending outwardly from the drum surface may be employed to further reduce the fabric into its constituent fibers. The blades, or blades and pins, shred the fabric to a fibrous state. The fibers are then passed though a blower in which the fibers are blown upward, while the button/zipper fragments and other non-fiber materials drop down and are separated from the fibers. Large flags and bits may also drop out. However, removing all flags and bits would reduce the volume of material that is processed, so many mills separate the flags and bits from the button/zipper fragments, and mix them back into the shredded fiber. The resulting mass of fiber is referred to as shoddy. Rag mills generally separate synthetic fabric from natural fibers, and thus generate both poly shoddy and cotton shoddy. The cotton shoddy is generally more valuable because it is useful in papermaking. Poly shoddy, when processed into a non-woven mat, is often used as carpet pads or sound insulation matting in vehicles and as a filler in the furniture industry, for cushions and futons. Generally, the supply of poly shoddy exceeds the demand, and the material must often be discarded in a landfill.

In one aspect of the present invention, conventionally processed poly shoddy is used as a sorbent material. The majority of poly shoddy is delustered synthetic fiber, which as described above, exhibits adsorbent and absorbent properties with respect to hydrocarbon products. However, conventionally processed poly shoddy does not achieve the preferred wadded mass described above, because in conventional fabric recycling, no control is applied in maintaining the lengths of the fibers produced. As noted above, to achieve the desired wadded mass, a majority of the fibers are preferably relatively short (approximately 10 mm in length), and a minority of the fibers are preferably relatively long (approximately 90 mm in length), with a range of different fiber lengths in between these two extremes. It has been determined that this composition of fiber lengths consistently achieves a wadded mass that includes a considerable volume of interstitial spaces, which significantly enhance the absorbency of the mass of fibers as compared to the same fibers employed in a non-woven mat.

One important aspect in achieving the desired wadded mass is in control of the fiber length, which is not a relevant factor in the prior uses of poly shoddy. Thus, the conventional process used for producing poly shoddy must be changed to include the step of controlling the fiber length. It is anticipated that the step of controlling the fiber length will be a function of the type of equipment that a rag mill uses to produce the sorbent fibers. Each rag mill will have detailed knowledge relating to their specific type of equipment that will enable them to produce fibers according to a desired specification. One aspect of the present invention is providing those desired specifications to a rag mill, to achieve the desired characteristics for the wadded mass. Empirical tests have determined that a specification of fiber lengths between 10 mm–90 mm, with a majority of fibers being relatively short, can be met by rag mills using conventional processing equipment.

It is anticipated that the rag mills will use a variety of methods to achieve the above-noted specification. For example, the rag mills can reduce the speed at which their units normally operate, to enable them to achieve better control of fiber lengths. Normally, customers desiring poly shoddy provide no specifications, and under those circumstances, it is desirable for the rag mill to process as much material, as fast as possible, to make maximum use of their capital intensive equipment.

Another variable that rag mills can control to meet the above fiber length specification is to the distance from the cutting and pinning drums to the table or conveyor belt along which the fabric waste is moving. Normally, this dimension is kept relatively high to allow bulky items such as polyester jackets or sleeping bags to pass under the drums. Adjusting this dimension will effect both the fiber length, and the extent to which a fabric is reduced into fiber. The rag mill operator may also presort the material to be shredded, to remove bulky items such as jackets and sleeping bags, that would require more height between the drum and table or conveyor belt, to prevent the processing line from being jammed or disrupted.

Another option would be to send already shredded material back through the processing line again, to achieve the desired shorter fiber lengths. This step of reprocessing the fibers could be repeated until a majority of the fiber lengths fall in the desired ranges. Should an insufficient amount of relatively long fibers be present, then a small portion of less processed (hence longer) fibers can be added to the relatively short fibers generated from repeated processing, until the desired ratio of long to short fibers is achieved. While some processing lines may require such manipulation, it is anticipated that reducing processing speed, changing drum heights, and/or preprocess sorting will be preferred as lower cost techniques to achieve the fiber length specification. The fibers meeting the length specification are then mechanically mixed and processed through a blower to achieve the desired loft.

As noted above, in conventional shoddy processing, the poly shoddy product often includes significant amounts of unprocessed fabric, or patches of fabric that have not been reduced to fiber. The presence of these patches, referred to as flags (or bits), is generally not critical to non-sorbent applications for shoddy, and rag mills typically do not separate the flags from the fibers. In fact, removing such flags not only increases processing costs, but also decreases the volume of shoddy that can be generated. Preferably, the specification provided to the rag mill for poly shoddy in accord with present invention should include a requirement to remove the flags and bits from the shredded fiber, to ensure that a highly sorbent product that is primarily fibers is produced.

An additional preferred specification will require the rag mill to presort the textile/fabric waste that enters the processing line, to ensure that a desired mixture of fiber types is achieved. As noted above, a mixture of about 90% synthetic to about 10% natural fibers is preferred.

It is likely that the specifications referred to above will generally increase the processing cost of a delustered synthetic fiber based sorbent in accord with the present invention, as compared with traditionally produced poly shoddy. However, the economics of the rag mill industry are such that poly shoddy is a relatively low value commodity. At times, the supply of poly shoddy far exceeds the demand. Under such circumstances, a rag mill may need to pay to dispose of scrap fabric on hand, rather than shred the material and hope for a buyer in the future. Providing a sorbent market for poly shoddy would benefit the rag mill industry and far outweigh any additional production costs. Finally, because the value of the raw material is so low, even additional processing costs will not increase the cost of a poly shoddy based sorbent so much that it is not competitive with traditional sorbent products. Indeed, current economic conditions appear to strongly favor a poly shoddy based sorbent. Those economic conditions, coupled with the excellent sorbency of such a delustered poly shoddy based sorbent, and the environmental advantages of using a recycled sorbent, are anticipated to make such a sorbent product very popular.

While the sorbent wadded mass of the present invention is particularly well adapted to be used to remove oil from bodies of water, due to its rapid sorbency, its high sorbent capacity, its cohesiveness, its low cost, its ability to be pressed to recover spilled product, and the fact that its density enables it to float on the surface of the water, the sorbent wadded mass of the present invention can also be used in filtering applications. As discussed in more detail below, a sorbent wadded mass in accord with the present invention is useable in a filter frame, in which the sorbent retains its wadded mass configuration. As the following example documents, the delustered hydrophobic and lipophilic fibers of the present invention produce a filter media effective in removing oils, greases, suspended particulates, vegetable oils, and animal oils. When employed as a filter media, the delustered hydrophobic and lipophilic fibers do not significantly impede water flow. Various different filter configurations are possible. While it is anticipated that a wadded mass will provide superior filtering abilities, due to the significant interstitial volume in a wadded mass, it should be noted that some filter applications may preferably employ a mat or pad configuration, as opposed to a wadded mass configuration. Even when the delustered hydrophobic and lipophilic fibers of the present invention are configured in a mat or pad, such that the additional sorbency of the wadded mass configuration is not achieved, such delustered hydrophobic and lipophilic fibers are very useful in removing oils and other hydrocarbons from a mass of water flowing through the fibers. Filter units using such delustered hydrophobic and lipophilic fibers can be designed to have a size and shape compatible with most filtering applications. Furthermore, while a primary use of the present invention as a sorbent product is expected to be its use to remove and recover petroleum products from a water surface, it should be noted that the present invention is also an excellent sorbent material for sorbing animal and vegetable oils.

It has been noted that the wadded mass of the present invention can be beneficially encapsulated in a porous envelope, such as a boom. Booms (generally long cylindrical shaped structures of varying length) are often used to encircle a hydrocarbon spill to prevent it from spreading over a larger area. Alternatively, pillows or socks (small booms) are sometimes used for smaller spills.

It has been anticipated that booms filled with the delustered hydrophobic and lipophilic fibers of the present invention could be employed to completely encircle an oil (or other hydrocarbon) spill. A ship or barge deploying the booms would preferably be positioned immediately adjacent to, or even to serve as part of the booms encircling the spill; and preferably the booms will be connected end-to-end, to form a continuous boom. The encircled spill can then be gradually reduced in size, by having the barge or ship draw some of the booms from the surface, causing the encircled area to become smaller. During this process, the withdrawn booms can be pressed to remove any sorbed oil, and the regenerated booms, from which the oil has been removed, can be re-deployed along the perimeter of the encircled spill, sorbing more oil. The process of removing a portion of the booms, reducing the size of the encircled spill, and replacing spent booms with freshly regenerated booms would be repeated until the spill is substantially removed from the surface.

The delustered shoddy of the present invention can also be used to produce sorbent blankets and pads. Non-woven sorbent pads are available in varying sizes, but generally, they are one square foot in area or less, while sorbent blankets are considerably larger in area. As will be discussed below, the delustered hydrophobic and lipophilic fibers of the present invention can be beneficially employed in a compressed state as a useful sorbent, although the absorbency provided by the interstitial volumes of the wadded mat is significantly reduced. One way of producing a sorbent blanket that retains much of the absorbency of the wadded mass described above is to provide a "quilted" blanket of the material. A quilted sorbent blanket, as described herein and the claims that follow, is an encapsulating envelope produced in sizes and shapes of conventional sorbent blankets that includes a plurality of individual chambers, each filled with a wadded mass of delustered hydrophobic and lipophilic fibers. These individual chambers are defined by a plurality of baffles, or by a plurality of parallel channels. A baffle arrangement segments a quilted sorbent blanket into a plurality of quadrilateral segments joined (or quilted) together to form the blanket. Each baffle is separate from the other baffles, and contains a quantity of delustered hydrophobic and lipophilic fibers in a wadded mass configuration. The encapsulating baffle is porous, so hydrocarbon can pass through the baffle and be sorbed by the encapsulated wadded mass. The purpose of the plurality of baffles is to ensure that the wadded mass remains evenly distributed throughout the quilted blanket, rather than clumping together at an end of the blanket. A channel configuration works the same way, except the channels are generally elongate in shape, significantly narrower than baffles, and a single channel generally runs the length of the quilted sorbent blanket. In a baffle configuration, a plurality of baffles are required to span the length of the blanket. Such baffles and channels are commonly used in producing down comforters, to ensure that the down in such a comforter remains evenly distributed, and retains a desired loft. The baffles and channels in a quilted sorbent blanket similarly ensure that the desired wadded mass configuration of the delustered hydrophobic and lipophilic fibers is maintained.

In yet another embodiment of the present invention, a wadded mass of the delustered hydrophobic and lipophilic fibers is compressed into a mat or pad. While such a compressed mass of delustered hydrophobic and lipophilic fibers does not yield results equivalent to the same fibers in a loose wadded mass (as compressing the wad into a pad eliminates much of the interstitial volume in the wadded mass in which absorbency occurs), the delustered fibers still exhibit very useful adsorbent properties. Particularly when the fibers have been delustered with titanium dioxide, each individual fiber exhibits a substantial surface area (see FIG. 3), enabling each fiber to adsorb much more hydrocarbon product than can be adsorbed by a non-delustered fiber. Even in a compacted wadded mass state, delustered hydrophobic and lipophilic fibers can be beneficially employed in a variety of filter and sorbent products.

It is anticipated that delustered hydrophobic and lipophilic fibers can be used to form non-woven pads, filters, mats and blankets in a variety of thicknesses, sizes, and shapes. One technique that is expected to be useful in fabricating such non-woven sorbent and filter products is needle punching, or needle weaving. The sorbent fibers are placed on a fine mesh screen of metal, fiber or plastic. A plurality of hooked needles are "punched" into the mass, so that the needles penetrate the fine mesh screen. As the needles are punched into the mass, and then withdrawn, some of the fibers are caught by the needles, and drawn through the mesh screen, binding the mass of fibers to the screen at a plurality of locations, both compressing the mass of fibers and securely affixing the mass of fibers to the mesh screen. The resulting needle punched mat can be cut to a desired size or shape, and employed as a filter, a sorbent pad, a sorbent mat, or a sorbent blanket (depending on the size of the screen).

Experimental Results

A plurality of different studies were performed on the sorbent wadded mass of the present invention. The following section includes physical characteristics of a preferred embodiment of the present invention produced from poly shoddy, as well as results and summaries of different sorption tests performed on the preferred embodiment.

Physical Analysis of One Preferred Embodiment

An independent laboratory analyzed a sample of a preferred embodiment produced from poly shoddy, using a variety of micro-analytical techniques, including polarized light and phase contrast microscopy, dispersion staining, gravimetric, and flame/hot plate studies. The sample consisted of short (10 mm–15 mm) plugs of fiber, of various types, bound into coherent wads by much longer (~90 mm) mono filament fibers. The fibers were predominantly stiff, heavily delustered synthetic fibers (~94%), the balance being plant and animal fibers. Fiber-to-fiber traction was facilitated by fiber lengths as well as delustering agents, specifically titanium dioxide particles that had been used to roughen the outer surfaces of the fibers.

A 90 cubic inch (6 inch×5 inch×3 inch) sample was dissected under a stereo dissection microscope, and distinct fiber types were mounted in a variety of refractive index oils. Randomized mounts were also selected. The mounts were analyzed with respect to structure, birefringence, sign of elongation, and refractive indices, using polarized light and phase contrast. The results were keyed using the McCrone Research Institute's Particle Atlas and a dispersion staining guide from the same source. In addition to the fibers noted below, trace amounts (<1%) of rayon were noted.

| Polyester (50% delustered) | ~70% | ~45 $\mu$m diameter | 15–50 mm lengths |
|---|---|---|---|
| Nylon (delustered) | ~20% | ~15 $\mu$m diameter | 15–90 mm lengths |
| Cotton (colored) | ~6% | ~10–30 $\mu$m diameter | ~10 mm lengths |
| Acrylic (Orlon) | ~2% | ~10–30 $\mu$m diameter | ~10 mm lengths |
| Wool | ~1% | ~10–15 $\mu$m diameter | ~7 mm lengths |
| Triacetate | <1% | ~20 $\mu$m diameter | ~10 mm lengths |
| Modacrylic | <1% | ~50 $\mu$m diameter | ~10 mm lengths |

Absorbent properties are due to large interstitial spaces and fluid traction on the fiber surfaces. Simple surface area profiles are enhanced due to the convoluted cross sections of some fibers, delustering, and penetration of the material being sorbed into the fiber interior. The following sorption tests were performed using the sorbent wadded mass analyzed above.

Recovery of Motor Oil from a Wadded Mass

The sorbency of the embodiment analyzed above was tested using motor oil. Less than 0.5 grams (0.4775 grams) of the sorbent wadded mass were placed in a sample container and 12.5 grams of motor oil were added. The sorbent wadded mass was allowed 30 minutes to sorb the oil to saturation. The saturated sorbent was removed, and "allowed" to drip excess oil back into the sample container for 18 hours. It should be noted that no oil was observed "dripping" back into the sample container, but for a large portion of the 18 hours the sorbent was not being continually monitored, so that it is possible that some unobserved dripping could have occurred. The oil saturated wadded mass was then weighed, and found to have sorbed 7.1 grams of oil (15 times its own weight). The oil saturated wadded mass was then squeezed in a press to recover the sorbed oil. The recovered oil was weighed, and it was determined that 87.8% of the 7.1 grams of sorbed oil was recovered simply by squeezing the sorbent.

Motor Oil Sorbency Comparison of Wadded Mass with Sorbent Pad

The sorbency of the embodiment analyzed described above was compared to an ASTM Type 1 pad standard using ASTM method F726-81, "Sorbent Performance of Adsorbents." This test measures the maximum adsorption of oils and floating immiscible liquids. Three replicates of the test were performed for each material, using both motor oil and vegetable oil. On average, the ASTM pad sorbed 7 times of its own weight of vegetable oil, and 8 times of its own weight of motor oil. In comparison, the wadded mass of present invention sorbed 17 times of its own weight of vegetable oil, and 21 times of its own weight of motor oil.

Truck Wash Runoff Samples

Actual samples from a truck wash runoff were analyzed, both before and after filtering using the sorbent wadded mass of the present invention. The test measured the wadded mass' ability to remove organic pollutants from a water stream. The use of real world samples ensured that the wadded mass' ability to handle dissolved hydrocarbons, emulsifiers, detergents, and miscellaneous debris (dirt, rocks, etc.) was adequately tested. The truck wash runoff sample was homogenized, and a control sample was analyzed to determine the baseline levels of various pollutants. Next, the balance of the sample was passed through a three step filter process, wherein each step involved passing the sample through a wadded mass filter. At each step, a noticeable improvement in clarity, color and odor was observed.

Particularly notable results involved the reduction is oil and grease, diesel, and motor oil.

| Pollutant | Unfiltered | Filtered |
| --- | --- | --- |
| Oil & Grease | >1000 PPM | 6 PPM |
| Suspended Solids | 230 PPM | 10 PPM |
| Diesel Oil | 910 PPM | 3.4 PPM |
| Motor Oil | 15,000 PPM | 3 PPM |

Comparison of Wadded Mass and a Prior Art Granular Sorbent

The next test compared the sorbency of the wadded mass (whose physical characteristics are described above), and a granular polymer based sorbent that is intended to be dispersed on a spill in a granular form and then reacts to form a jelly-like mass (see U.S. Pat. No. 5,304,311). The test involved placing identical amounts of each sorbent in a pre-cleaned sample container filled with 200 ml of water and 10 g of a motor oil/diesel fuel mixture. Each sorbent was allowed to sit in the sample mixture for an identical period of time and then removed. The sample was then analyzed to determine how much of the motor oil/diesel fuel mixture was sorbed.

Figure 9:
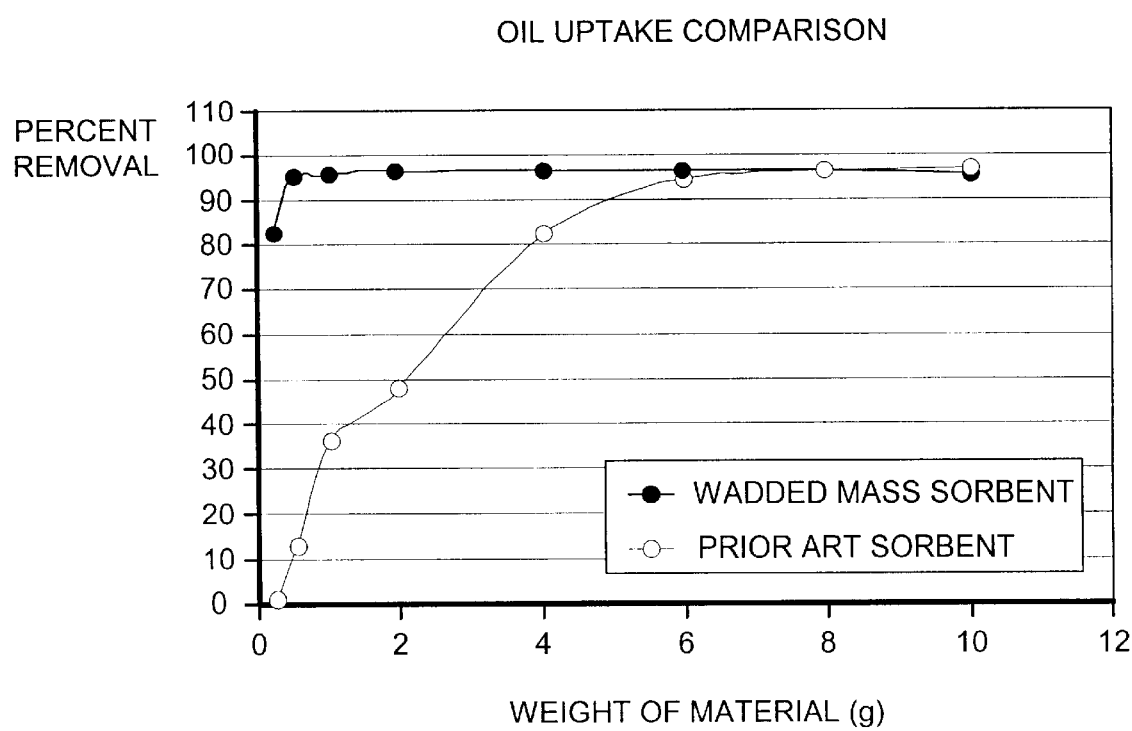
FIG. 9 is a graphical comparison of the sorbent properties of a wadded mass in accord with the present invention, and a prior art sorbent.
Figure 10:
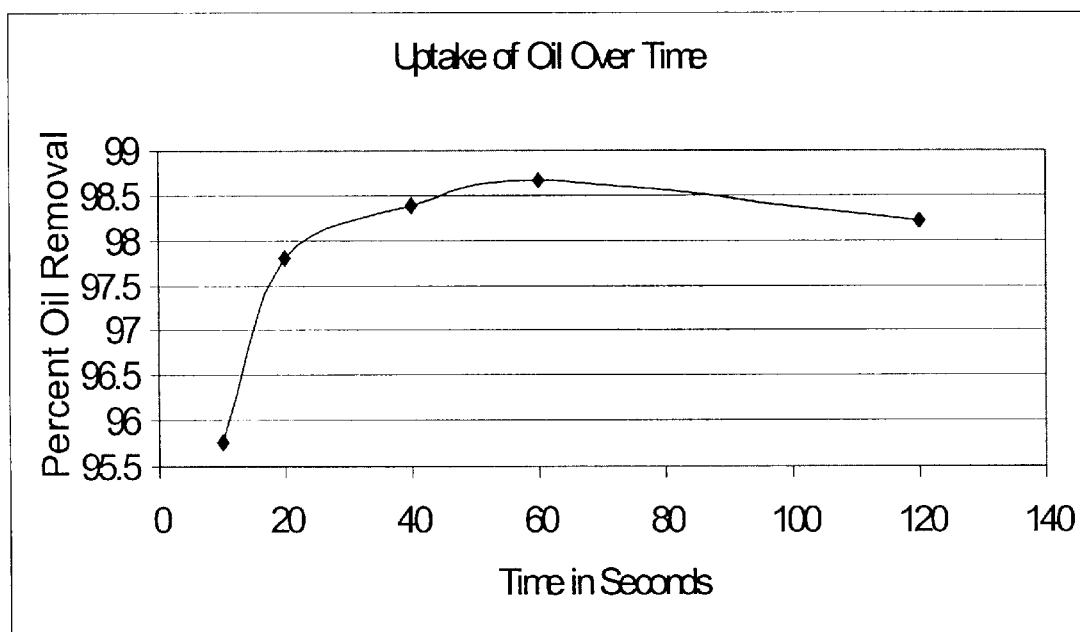
FIG. 10 is a graphical illustration of the sorbency of a wadded mass over time.

When a sufficient amount of sorbent was employed, the wadded mass and granular sorbent each removed over 96% of the motor oil/diesel fuel mixture from the water. However, several noticeable differences were observed when smaller amounts of sorbents were employed. For example, the sorbent wadded mass of the present invention required only 0.5 grams to sorb 96% of the motor oil/diesel fuel mixture. In contrast, the granular sorbent required almost 8 grams to sorb the same 96%. At the point of saturation, the wadded mass sorbs more than 32 times its own weight, while the granular sorbent reaches saturation at less than 3.6 times its own weight. Thus, the wadded mass of the present invention can be employed in much smaller quantities than the prior art granular sorbent, and yet will achieve the same result. FIG. 9 graphically illustrates these findings.

Additional differences relating to the time required for sorption were also noted. The wadded mass began visibly sorbing the motor oil/diesel fuel mixture immediately upon contact, while the granular sorbent required several minutes to equilibrate and begin the sorption process.

Time Required for Wadded Mass to Achieve Peak Sorbency

A test to determine the oil sorption of a wadded mass (whose physical characteristics are described above) over time was performed with used motor oil. Five glass sample jars were used, each partially filled with water, and each jar also contained 10 grams of oil. The sample glass jars were marked 10, 20, 40, 60, and 120 for the time (in seconds) that the sorbent material would be allowed to remain in each jar.

A 1 gram sample of the delustered synthetic fiber wadded mass was then added to each sample jar. The wadded mass was mixed continuously after introduction for the specified time period corresponding to each jar. A stop watch was employed to measure elapsed time. At the end of the required time period, the wadded mass was removed from each jar.

For each jar, it was observed that the sorbent immediately began removing oil from the water. Also in each jar, residual oil was observed adhering to the sides of the glass jar, and residual oil remained there after the wadded mass was removed. After the oil sorbed wadded mass was removed from each jar, 50 ml of trichlorotrifluoroethane were added to extract the residual oil from each jar. The resulting extraction solvent was then evaporated, and the residual oil was weighed to calculate the percentage of oil that was sorbed by the wadded mass in each jar.

After only 10 seconds of exposure to the wadded mass, over 95% of the oil was removed (9.57 grams of oil). The percentage of oil removed with further exposure to the wadded mass continued increase with time, to about 98%, which was achieved after 40 seconds. Because oil was visibly adhering to the sides of the glass jars, it is believed that after just 40 seconds, substantially all of the free oil (the oil floating on the water) was removed by the wadded mass.

While the present invention has been described in connection with preferred forms for practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A sorbent wadded mass suitable for adsorbing a liquid hydrocarbon that is contaminating a body of water, said sorbent mass comprising:

(a) a plurality of relatively shorter hydrophobic and lipophilic synthetic fibers, said relatively shorter hydrophobic and lipophilic synthetic fibers having rough, delustered surfaces, wherein said plurality of relatively shorter hydrophobic and lipophilic synthetic fibers comprises a mixture of polyester fibers and nylon fibers;

(b) a plurality of relatively longer hydrophobic and lipophilic synthetic fibers, said relatively longer hydrophobic and lipophilic synthetic fibers having rough, delustered surfaces, said relatively longer hydrophobic and lipophilic synthetic fibers and said rough delustered surfaces binding said plurality of relatively shorter hydrophobic and lipophilic synthetic fibers and said plurality of relatively longer hydrophobic and lipophilic fibers into a wadded mass, said wadded mass including a plurality of interstitial spaces and having a density that is substantially less than that of water, so that said wadded mass is adapted to float on a surface of a body of water, wherein said plurality of relatively longer hydrophobic and lipophilic synthetic fibers comprises a mixture of polyester fibers and nylon fibers; and (c) a porous cover encasing said wadded mass.

2. The sorbent wadded mass of claim 1, wherein said porous cover comprises a boom.

3. A sorbent wadded suitable for adsorbing a liquid hydrocarbon product, said sorbent mass comprising:
(a) a plurality of relatively shorter hydrophobic and lipophilic synthetic fibers, a majority of said plurality of relatively shorter hydrophobic and lipophilic synthetic fibers having lengths ranging from about 10 mm to about 20 mm, wherein said plurality of relatively shorter hydrophobic and lipophilic synthetic fibers comprises a mixture of polyester fibers and nylon fibers; and
(b) a plurality of relatively longer hydrophobic and lipophilic synthetic fibers, a majority of said plurality of relatively longer hydrophobic and lipophilic synthetic fibers having lengths ranging from about 70 mm to about 90 mm, said relatively longer hydrophobic and lipophilic synthetic fibers binding said plurality of relatively shorter hydrophobic and lipophilic synthetic fibers and said plurality of relatively longer hydrophobic and lipophilic fibers into said wadded mass, wherein said plurality of relatively longer hydrophobic and lipophilic synthetic fibers comprises a mixture of polyester fibers and nylon fibers.

4. The sorbent wadded mass of claim 3, wherein each mixture of polyester fibers and nylon fibers comprises substantially more polyester than nylon.

5. The sorbent wadded mass of claim 4, wherein a ratio of polyester fibers to nylon fibers ranges from about 2:1 to about 4:1.

6. The sorbent wadded mass of claim 3, wherein said plurality of relatively shorter hydrophobic and lipophilic fibers and said plurality of relatively longer hydrophobic and lipophilic fibers have rough, delustered surfaces, said rough, delustered surfaces providing fiber-to-fiber traction that enhances a cohesiveness of said wadded mass, said rough, delustered surfaces further enhancing a volume of interstitial space within said wadded mass, said interstitial space enabling said sorbent mass to also absorb said liquid hydrocarbon, the absorption occurring within said interstitial spaces.

7. The sorbent wadded mass of claim 3, wherein said relatively shorter hydrophobic and lipophilic fibers and said relatively longer hydrophobic and lipophilic fibers comprise fibers ranging in length from about 5 mm to about 100 mm.

8. The sorbent wadded mass of claim 3, wherein said wadded mass is capable of adsorbing an amount of liquid hydrocarbon up to about 25 times a weight of said wadded mass.

9. A delustered fiber sorbent suitable for adsorbing an organic liquid, said delustered fiber sorbent comprising:
(a) a plurality of relatively shorter delustered hydrophobic and lipophilic synthetic fibers, wherein said plurality of relatively shorter delustered hydrophobic and lipophilic synthetic fibers comprises a mixture of polyester fibers and nylon fibers, and
(b) a plurality of relatively longer delustered hydrophobic and lipophilic synthetic fibers, wherein said plurality of relatively longer delustered hydrophobic and lipophilic synthetic fibers comprises a mixture of polyester fibers and nylon fibers.

10. The delustered fiber sorbent of claim 9, wherein:
(a) said plurality of relatively shorter hydrophobic and lipophilic synthetic fibers includes a majority of relatively shorter hydrophobic and lipophilic synthetic fibers having lengths ranging from about 10 mm to about 20 mm; and
(b) said plurality of relatively longer hydrophobic and lipophilic synthetic fibers includes a majority of relatively longer hydrophobic and lipophilic synthetic fibers having lengths ranging from about 70 mm to about 90 mm, said relatively longer hydrophobic and lipophilic synthetic fibers binding said plurality of relatively shorter hydrophobic and lipophilic synthetic fibers and said plurality of relatively longer hydrophobic and lipophilic synthetic fibers into a wadded mass.

11. The delustered fiber sorbent of claim 9, wherein said plurality of delustered hydrophobic and lipophilic synthetic fibers comprises:
(a) a majority of relatively shorter hydrophobic and lipophilic synthetic fibers; and
(b) a minority of relatively longer hydrophobic and lipophilic synthetic fibers.

12. The delustered fiber sorbent of claim 9, further comprising a plurality of hydrophilic fibers, such that said delustered fiber sorbent comprises substantially more delustered hydrophobic and lipophilic synthetic fibers than hydrophilic fibers.

13. The delustered fiber sorbent of claim 9, wherein said delustered hydrophobic and lipophilic synthetic fibers have been delustered with titanium dioxide.

14. The delustered fiber sorbent of claim 9, wherein said delustered hydrophobic and lipophilic synthetic fibers are encased in a porous, encapsulating envelope.

15. The delustered fiber sorbent of claim 14, wherein said porous, encapsulating envelope comprises at least one of a boom, a pillow, a sock, a quilted blanket and a filter unit.

16. The delustered fiber sorbent of claim 15, wherein said quilted blanket comprises one of baffles and channels to enhance a wadded mass configuration of said delustered hydrophobic and lipophilic synthetic fibers.

17. The delustered fiber sorbent of claim 9, wherein said delustered hydrophobic and lipophilic synthetic fibers are formed into at least one of a sorbent pad and a sorbent blanket.

18. The delustered fiber sorbent of claim 9, wherein said delustered hydrophobic and lipophilic synthetic fibers are needle punched to form at least one of a sorbent pad and a sorbent blanket.

19. A delustered fiber filter suitable for removing an organic liquid from a mass of water, said delustered fiber filter comprising a plurality of delustered hydrophobic and lipophilic synthetic fibers, wherein said plurality of delustered hydrophobic and lipophilic synthetic fibers comprises:
(a) a mixture of polyester fibers and nylon fibers; and
(b) a mixture of relatively shorter fibers and relatively longer fibers.

20. The delustered fiber filter of claim 19, wherein said plurality of delustered hydrophobic and lipophilic synthetic fibers further comprises:
(a) a majority of relatively shorter hydrophobic and lipophilic synthetic fibers; and
(b) a minority of relatively longer hydrophobic and lipophilic synthetic fibers.

21. The delustered fiber filter of claim 19, further comprising a plurality of hydrophilic fibers, such that said delustered fiber filter comprises substantially more delustered hydrophobic and lipophilic synthetic fibers than hydrophilic fibers.

22. The delustered fiber filter of claim 19, wherein said delustered fiber filter does not substantially impede a flow of water through said delustered fiber filter.

* * * * *